United States Patent
Rogers et al.

[11] Patent Number: 5,916,703
[45] Date of Patent: Jun. 29, 1999

[54] ENERGY STORAGE CELL WITH HYDROGEN VENT

[75] Inventors: Howard H. Rogers, Torrance; Steven J. Stadnick, Lakewood, both of Calif.

[73] Assignee: Hughes Electronics, Los Angeles, Calif.

[21] Appl. No.: 08/683,008

[22] Filed: Jul. 16, 1996

[51] Int. Cl.[6] .................................................. H01M 2/12
[52] U.S. Cl. ................ 429/53; 429/61; 429/101
[58] Field of Search ................ 429/53, 61, 101

[56] References Cited

U.S. PATENT DOCUMENTS

| | | |
|---|---|---|
| 3,669,744 | 6/1972 | Tsenter et al. |
| 4,000,350 | 12/1976 | Wittmann .................................. 429/66 |
| 4,250,235 | 2/1981 | DuPont et al. ........................... 429/211 |
| 4,262,061 | 4/1981 | Rogers ....................................... 429/27 |
| 4,283,844 | 8/1981 | Milden et al. ........................... 29/623.1 |
| 4,369,212 | 1/1983 | Rogers et al. ........................... 427/252 |
| 4,439,500 | 3/1984 | Gibbard et al. ...................... 429/53 X |
| 4,683,178 | 7/1987 | Stadnick et al. ........................ 429/101 |
| 5,085,951 | 2/1992 | Gyenes et al. ........................ 429/53 X |
| 5,300,369 | 4/1994 | Dietrich et al. ....................... 429/61 X |
| 5,532,074 | 7/1996 | Golben ..................................... 429/53 |

OTHER PUBLICATIONS

Rubin, L.R. "Purification of Hydrogen by Permeation Through Palladium and Palladium Alloys," *Engelhard Industries Inc Technical Bulletin*, vol. II, No. 1, pp. 8–15 (Jun. 1961).

*Primary Examiner*—Stephen Kalafut
*Attorney, Agent, or Firm*—Elizabeth E. Leitereg; Terje Gudmestad; W. K. Denson-Low

[57] ABSTRACT

A nickel-hydrogen energy storage cell includes a hermetic pressure vessel having a wall made of a nickel-base alloy, and a hollow tube made at least in part of palladium and joined to the wall of the pressure vessel such that an interior of the hollow tube is in communication with an interior of the pressure vessel. A heater controllably heats at least a portion of the hollow tube to increase the diffusion rate of hydrogen through the wall of the hollow tube and thereby controllably vent hydrogen from the pressure vessel. The energy storage cell further includes at least one plate set within the wall of the pressure vessel, an electrolyte, and a pair of electrical leads extending from the at least one plate set and through an electrical feedthrough in the wall of the pressure vessel.

18 Claims, 3 Drawing Sheets

ENERGY STORAGE CELL WITH HYDROGEN VENT

BACKGROUND OF THE INVENTION

This invention relates to energy storage cells, and, more particularly, to the control during service operations of the gas pressure within pressurized energy storage cells.

Rechargeable cells or batteries are electrochemical energy storage devices for storing and retaining an electrical charge and later delivering that charge as useful power. Familiar examples of the rechargeable cell are the lead-acid cell used in automobiles, and the nickel-cadmium cell used in various portable electronic devices. Another type of cell having a greater storage capacity for its weight is the nickel oxide/pressurized hydrogen cell, an important type of which is commonly called the nickel-hydrogen cell and is used in spacecraft applications. The weight of the spacecraft storage cell must be minimized while achieving the required performance level, due to the cost of lifting weight to earth orbit and beyond.

The nickel-hydrogen cell includes a series of active plate sets which store an electrical charge electrochemically and later deliver that charge as a useful current. The active plate sets are packaged within a hermetic pressure vessel that contains the plate sets and the hydrogen gas that is an essential active component of the cell. Each plate set includes a positive electrode, a negative electrode, and a separator between the two electrodes, all soaked with an electrolyte. In a typical cell, a number of plate sets are supported on a core under a compressive loading, with a gas screen between each plate set and with electrical connector leads extending to each electrode of each plate set. The gas screen provides a gas channel from the hydrogen electrode to the gas space outside the stack. A single nickel-hydrogen storage cell delivers current at about 1.3 volts, and a number of the cells are usually connected in series to produce current at the voltage required by the systems of the spacecraft.

During the operation of the nickel-hydrogen cell, hydrogen is produced within the pressure vessel. The hydrogen is intentionally produced during the charging portion of the charging/discharging cycle. Hydrogen is also undesirably produced by other mechanisms such as corrosion of the components within the cell by the electrolyte. With increasing service, the maximum hydrogen pressure within the cell could gradually rise to a value above the design limit of the pressure vessel and which could cause the pressure vessel to fail.

There is a need for an approach for avoiding potential pressure vessel failures due to hydrogen overpressures. The pressure vessel itself could be made stronger, but that would result in increased weight of the cell. The nickel precharge of the cell could be increased, but this approach would decrease the initial cell storage capacity. An electrical or electromechanical valve could be provided in the cell wall to release hydrogen, but such a valve would have to be highly reliable over extended service periods of many years and must not allow a reverse leakage of any contaminant cases into the hermetically sealed pressure vessel. No such valve is known at this time, and such a valve would add a significant amount of weight to the cell.

Accordingly, there is a need for an improved approach for the design of a storage cell in which there is the possibility of an overpressure of a gas such as hydrogen being produced during service. The present invention fulfills this need, and further provides related advantages.

SUMMARY OF THE INVENTION

The present invention provides an energy storage cell that is hermetically sealed yet which permits the safe and controllable reduction of gas overpressures produced during service within the storage cell. Little or no weight is added to the storage cell by the present approach. The energy storage structure and functioning of the storage cell are not altered. The storage cell remains hermetically sealed, so that exterior contaminants cannot pass into its interior.

In accordance with the invention, an energy storage cell comprises a hermetic pressure vessel having a wall, wherein a first portion of the wall is made of a first material having a relatively low diffusion coefficient of hydrogen therethrough. There is a vent means through the wall of the pressure vessel for removing hydrogen from the interior of the pressure vessel. The vent means includes a vent segment of the wall of the pressure vessel made of a second material that permits the catalyzed diffusion of hydrogen therethrough. Preferably, a heater is positioned adjacent to the vent segment. The storage cell contains at least one electrode pair within the wall of the pressure vessel, wherein each electrode pair comprises a positive electrode and a negative electrode, an electrolyte, and a pair of electrical leads extending from the at least one electrode pair and through an electrical feedthrough in the wall of the pressure vessel to the exterior of the pressure vessel.

The first material is preferably a nickel-base alloy, and the second material comprises palladium, such as pure palladium or a palladium-containing alloy. The vent segment is thus made of a material which achieves accelerated diffusion of hydrogen therethrough, and wherein the diffusion rate may be controlled by varying the temperature of the vent segment. A heater is therefore desirably positioned adjacent to the vent segment so that it may be controllably heated to increase the venting rate of hydrogen. The pressure within the pressure vessel is monitored, and a pressure controller commands operation of the heater at such time as the hydrogen pressure rises to a preselected value. Upon operation of the heater, the vent segment is heated and the diffusion of hydrogen through the vent segment is increased.

In one convenient configuration, the vent segment is a tube made at least in part of the second material. The interior of the hollow tube communicates with the interior of the pressure vessel. The tube configuration of the vent segment provides a relatively large diffusional area, whose temperature is readily controlled. The heater is positioned around the portion of the hollow tube made of the second material.

The present invention provides a highly reliable vent for reducing hydrogen pressure within a hermetically sealed pressure vessel of an energy storage cell and the energy storage cell using the vent. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
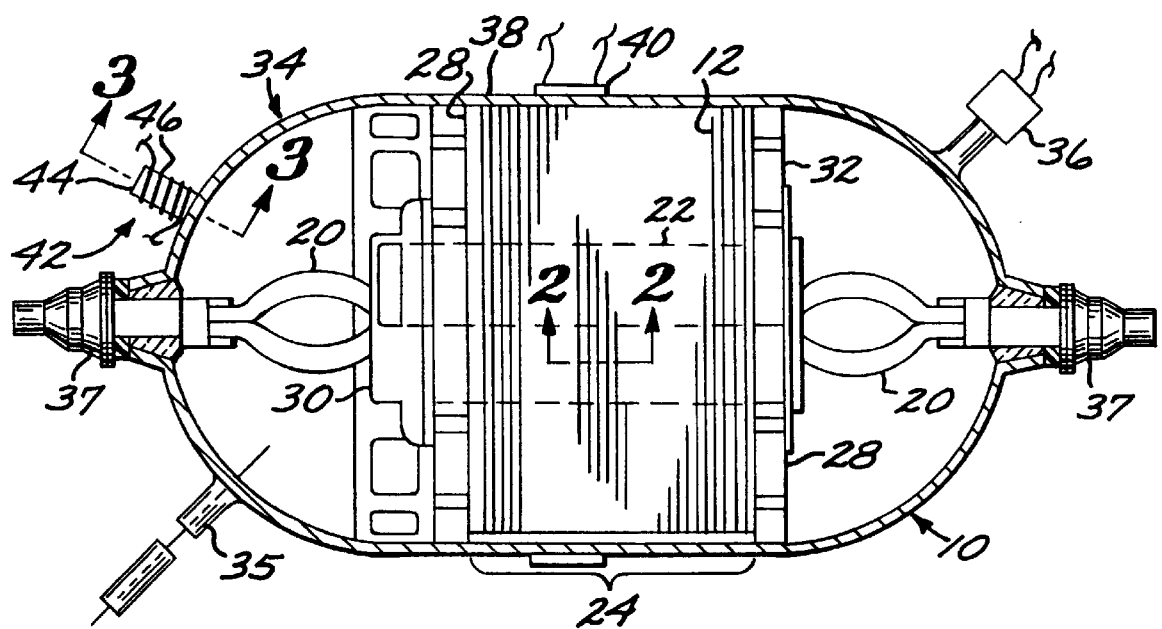
FIG. 1 is a sectional view of a flight-type nickel-hydrogen cell.
Figure 2:
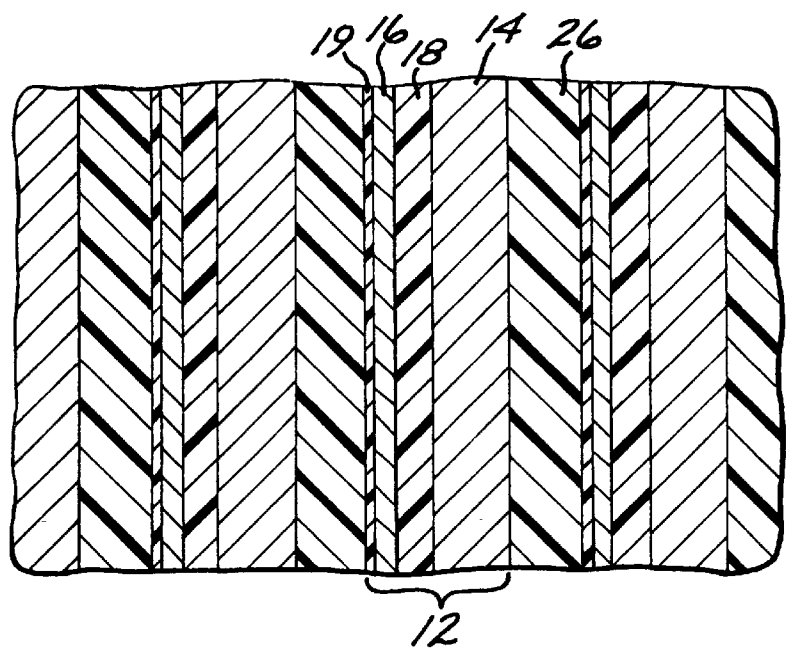
FIG. 2 is a detail of FIG. 1, taken generally on line 2—2 and illustrating the plate sets.

The present invention is preferably used in conjunction with a nickel-hydrogen energy storage cell 10, as illustrated in FIGS. 1–2, of the pressurized gas-metal cell type. Such a storage cell 10 typically comprises a plurality of individual plate sets 12. Each plate set in turn comprises a positive electrode 14, a negative electrode 16, and an electrolyte-containing separator 18, which physically separates the electrodes 14 and 16 and also supplies the electrolyte medium through which ionic and electron charge transfer. Charging and discharging of the electrodes 14 and 16 are accomplished through respective electrical leads 20.

Various constructions of nickel-hydrogen cells and components are disclosed in the following US Patents, whose disclosures are herein incorporated by reference: U.S. Pat. Nos. 4,683,178; 4,369,212; 4,283,844; 4,262,061; 4,250,235; 4,000,350; and 3,669,744.

The positive electrode 14 is formed by impregnating nickel hydroxide into porous sintered nickel that is supported on an etched nickel electrode substrate. The negative electrode 16 is coated on one side by a sintered mixture of platinum black and polytetrafluoroethylene and on the other side with a porous layer 19 of polytetrafluoroethylene. These layers are applied to a nickel substrate in the form of etched sheet or a woven mesh, to form the negative electrode 16. Many different types of separators 18 have been used, including, for example, asbestos, nylon, and a cloth of zirconium oxide-yttrium oxide. The electrolyte, preferably an aqueous solution containing 26–31 percent by weight concentration of potassium hydroxide, is impregnated into the separator 18, and thence reaches the electrodes 14 and 16.

The individual plate sets 12 are assembled onto a central core 22 to form a stacked array 24. A monofilament polypropylene screen 26 is placed between each plate set 12 during assembly, so that oxygen liberated during overcharging at each positive electrode 14 can diffuse away from the electrode 14 and to the negative electrode 16 to combine with hydrogen. The stacked array 24 is placed under a longitudinal pressure of, for example, about 10 pounds per square inch, by tightening compression plates 28 against each end of the stacked array 24. The tightening of the compression plates 28 is preferably accomplished by compressing the array 24 and then tightening a nut 30 on threads on the core 22, thereby compressing a Belleville washer set 32 against the compression plate 28 to hold the stacked array 24 in place.

The stacked array 24 is contained within a hermetically sealed pressure vessel 34 having a wall 38 manufactured of a first material such as Inconel 718 nickel-base alloy which can withstand internal pressures on the order of 1,000 psia, without damage by hydrogen embrittlement. The first material has a relatively low diffusion coefficient of hydrogen therethrough, so that hydrogen is contained within the interior of the pressure vessel 34. A gas fill tube 35 allows gas content and pressure within the pressure vessel 34 to be controlled initially. The gas fill tube 35 is sealed after the initial charging procedures. The pressure vessel 34 is typically constructed in the form of a cylindrical tube having domed ends. By way of illustration, the cell 10 having the pressure vessel 34 of external dimensions of $3\frac{1}{2}$ to $5\frac{1}{2}$ inches in diameter by 13–15 inches long contains about 40–100 individual plate sets 12, with a resulting electrical storage capacity of the cell of about 50 to about 350 ampere-hours. The cell 10 may be charged and discharged through thousands of cycles without apparent damage, if the charging and discharging are accomplished properly. A number of cells 10 are ordinarily combined in series or parallel arrangements as a battery.

The electrical leads 20 pass from the interior of the pressure vessel 34 to its exterior through electrical feedthroughs 37. The pressure within the pressure vessel 34 may optionally be monitored by any operable technique. One such pressure-monitoring device is a pressure gauge 36 communicating with the interior of the pressure vessel, which measures interior pressure directly. Another pressure-monitoring device is a strain gage 40 mounted to the exterior of the wall 38 of the pressure vessel 34. The deformation of the wall 38, as measured by the strain gage 40, is a function of the internal pressure within the pressure vessel 34, which functional dependence is determined in initial calibration testing. The strain gage 40 approach to pressure measurement is preferred, inasmuch as the strain gage is lighter than the pressure gauge and does not require a physical penetration into the interior of the pressure vessel that would be potentially a failure point.

A hydrogen vent 42 is provided as a segment of the wall 38 of the pressure vessel 34. The hydrogen vent 42 is a portion of the wall made of a second material that permits the catalyzed diffusion of hydrogen therethrough. The hydrogen vent 42 may be a piece of the second material mounted into the wall of the pressure vessel, but more preferably it is in the form of a hollow tube as will be discussed subsequently. (The term "hydrogen vent" as used herein means a solid section or portion of the wall through which hydrogen diffuses rapidly as compared with the remainder of the wall. "Vent" as used herein does not include a grillwork or the like, which would permit convective flow of gas therethrough in both directions, thereby rendering the package non-hermetic.) A preferred second material is pure palladium or a palladium alloy. An operable palladium alloy is a palladium-silver alloy such as palladium-25 weight percent silver.

Figure 3A:
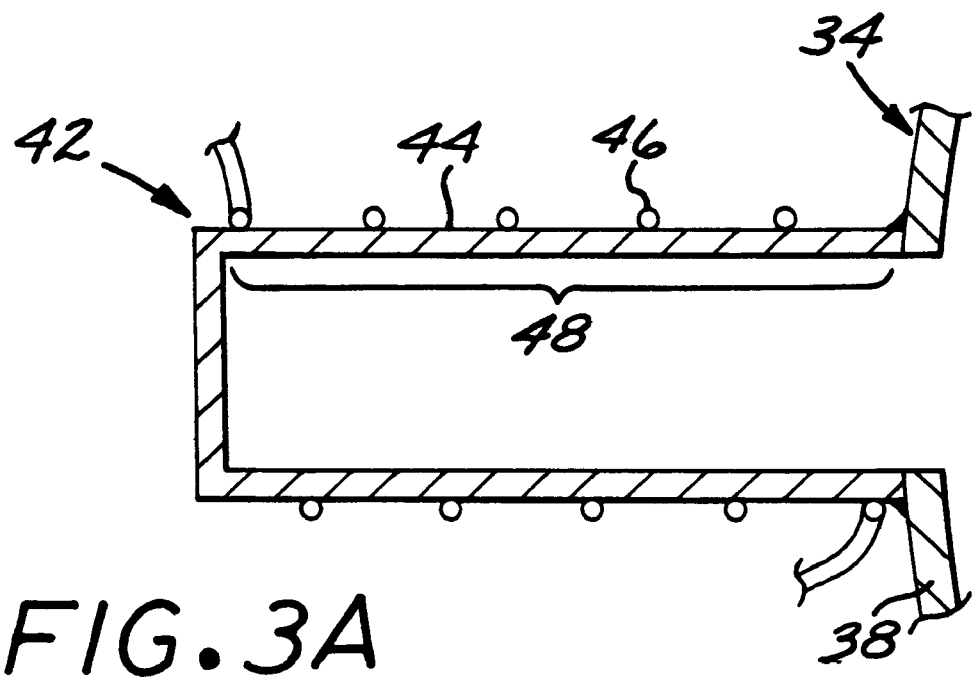
FIG. 3A is a detail of FIG. 1, taken generally on line 3—3 and illustrating a first embodiment of the hydrogen vent system.
Figure 3B:
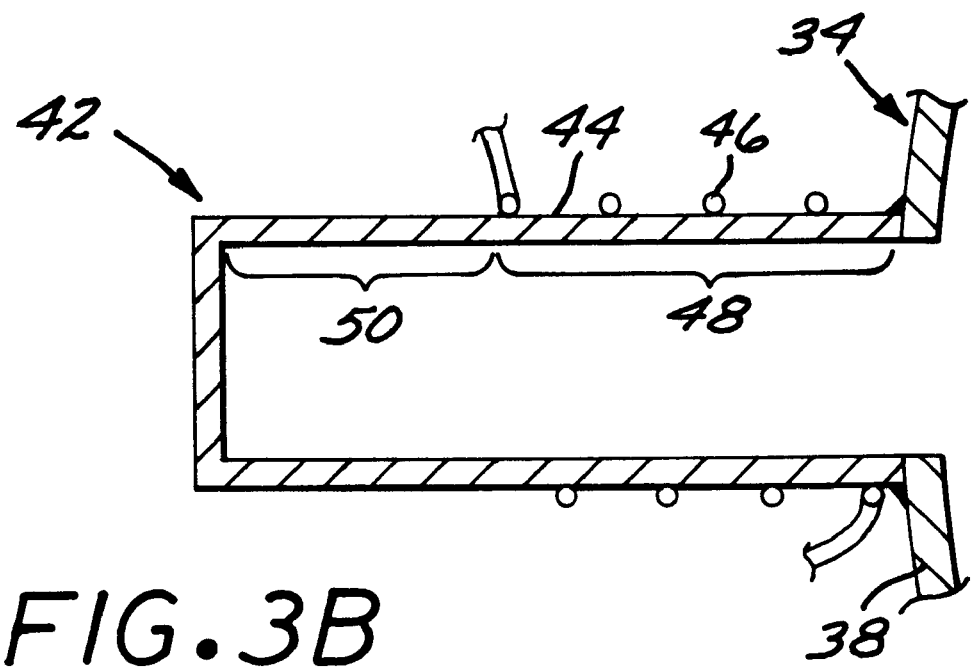
FIG. 3B is a detail of FIG. 1, taken generally on line 3—3 and illustrating a second embodiment of the hydrogen vent system.

The hydrogen vent 42 is preferably in the form of a generally cylindrical hollow tube 44, as shown for two embodiments in FIGS. 3A and 3B. The hollow tube 44 is affixed to the wall 38 of the pressure vessel 34. The hollow tube 44 is closed on one end, and on the other end its interior communicates with the interior of the pressure vessel 34. All or a portion of the hollow tube 44 is made of the second material. The hollow tube 44 is typically about 3 inches long by 0.180 inches outside diameter, and has a wall thickness of about 0.020 inches.

Figure 4:
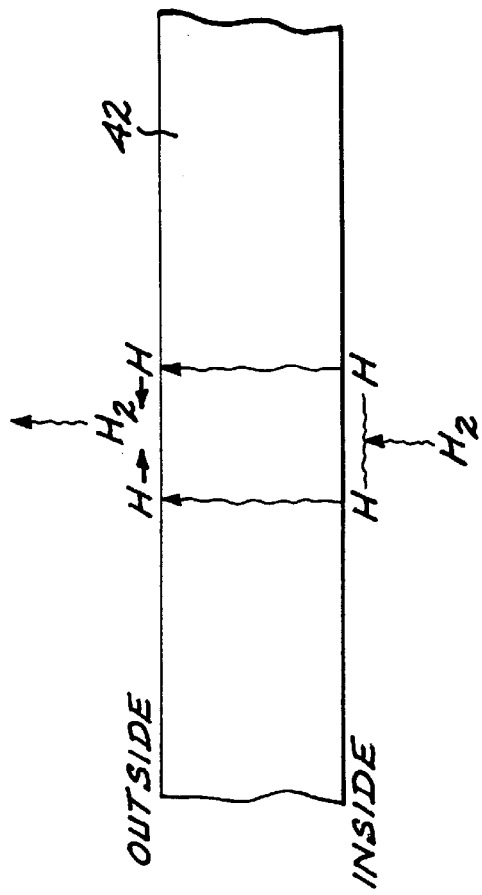
FIG. 4 is a schematic view of the hydrogen vent system and the diffusional mechanism of hydrogen therethrough.

In the preferred embodiment, the rapid hydrogen diffusion through the hydrogen diffusion vent occurs by a multistep mechanism of catalyzed diffusion of hydrogen, illustrated in FIG. 4. Hydrogen molecules ($H_2$) inside the hydrogen vent 42 (step 1) each dissociate (step 2) into two hydrogen atoms (2H) when they encounter the hydrogen vent 42 portion of the wall 38. The dissociated hydrogen atoms diffuse (step 3) through the hydrogen vent 42 portion of the wall 38 much more rapidly than do the undissociated hydrogen molecules. Upon reaching the outside surface of the hydrogen vent 42 portion of the wall 38, the diffusing hydrogen atoms recombine (step 4) to produce hydrogen molecules (step 5) outside the wall 38 that diffuse away. This mode of diffusion of hydrogen is accomplished by making the hydrogen vent 42 portion of the wall 38 of a material that, by its chemical nature, promotes the dissociation and recombination steps and also has a reasonably high rate of diffusion of hydrogen atoms therethrough. As indicated, pure palladium or palladium-silver alloys are preferred, but other materials such as palladium-nickel alloys may be used. One consequence of this diffusional mechanism is that the hydrogen vent 42 remains relatively impervious to diffusion of other gases, such as might otherwise occur for gaseous contaminants diffusing from the exterior to the interior of the hydrogen vent and thence the pressure vessel.

The catalyzed diffusion process illustrated in FIG. 4 produces an effective diffusion rate of hydrogen out of the interior of the hollow tube 44 and thence from the interior of the pressure vessel 34 that is a function of the temperature of the hollow tube 44. To achieve controllability of the net diffusion of hydrogen out of the interior of the pressure vessel 34, the hydrogen vent 42 portion of the hollow tube 44 is preferably made sufficiently thick (e.g., about 0.020 inches) that there is little diffusion therethrough at ambient temperature, but that the diffusion of hydrogen therethrough is significantly increased at moderately elevated temperatures. To achieve a moderately elevated temperature in the hydrogen vent 42, a heater 46 in the form of an insulated electrical resistance wire made of, for example, an alloy of 80 weight percent nickel, 20 weight percent chromium (available commercially as "Nichrome V" wire), is positioned around the hollow tube 44. By controllably passing an electrical current through the heater 46, the hollow tube 44 is heated and the diffusion rate of hydrogen therethrough is increased significantly. In actual operation of the hydrogen vent, the reduction of hydrogen pressure can take place over a period of hours or days, and therefore the diffusion rate out of the pressure vessel 34 through the hydrogen vent 42 need not be large. Moderate elevated temperatures of about 200° C. to about 700° C. can therefore be used for the venting operation. Temperatures at the lower end of this range, about 200° C., are preferred, because of possible degradation of the hollow tube 44 and increased power requirements for heating to high temperature.

One of the potential problems associated with the hydrogen vent in the form of the hollow tube 44 is the possible presence of gaseous water (evaporated from the aqueous electrolyte) in the interior of the hollow tube 44 that would impede the diffusion of hydrogen from the pressure vessel 34 into the hollow tube 44. Where such condensation is not expected to be a problem, the heater 46 may be wound over the entire length of the hollow tube 44 to form a heated zone 48, as shown in FIG. 3A. Where the presence of water in the hollow tube 44 cannot be discounted, a preferred approach to minimizing the adverse effect of the water is to wind the heater 46 over only a portion of the length of the hollow tube nearest the mouth of the hollow tube 44, so that there is a heated zone 48 and an unheated zone 50, as shown in FIG. 3B. Any water present will tend to condense in the unheated zone 50, away from the heated zone 48 where hydrogen diffusion occurs. Gaseous water will therefore not be present to impede the diffusion of hydrogen into the hollow tube 44. Other approaches to reducing any adverse effect of the presence of gaseous water may also be used.

Figure 5:
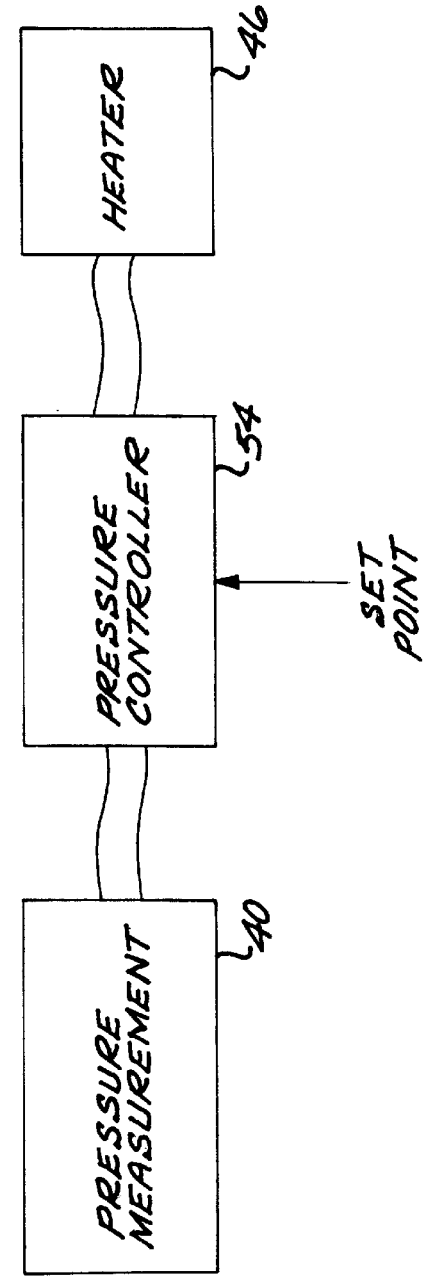
FIG. 5 is a block diagram view of a pressure controller that controls the operation of the hydrogen vent system.

The hydrogen pressure within the pressure vessel 34 is preferably controlled by a pressure controller system such as that shown in FIG. 5. The pressure within the pressure vessel 34 is measured by any operable technique, most preferably the strain gage 40 approach discussed previously. The pressure is supplied to a pressure controller 54, which compares the measured pressure to a set-point pressure provided as an input. If the measured pressure exceeds the set-point pressure, the heater 46 is activated to increase the hydrogen diffusion through the hydrogen vent 42 and reduce the hydrogen pressure within the pressure vessel. The pressure controller 54 may be found as a part of an onboard computer or other control system. Alternatively, it may be on the ground at the spacecraft control center, with the pressure measurement signal and the heater control signal telemetered between the spacecraft and the ground. The controller may also be operated in conjunction with other considerations such as pressure balancing of a number of interconnected storage cells.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An energy storage cell, comprising:
   a hermetic pressure vessel having a wall, a first portion of the wall being made of a first material that essentially does not permit the diffusion of hydrogen therethrough;
   vent means through the wall of the pressure vessel for removing hydrogen from the interior of the pressure vessel, the vent means including a vent segment of the wall of the pressure vessel made of a second material that controllably permits the diffusion of hydrogen therethrough;
   at least one plate set within the pressure vessel, each plate set comprising a positive electrode and a negative electrode;
   an electrolyte within the pressure vessel; and
   a pair of electrical leads extending from the at least one plate set and through an electrical feedthrough in the wall of the pressure vessel to an exterior of the pressure vessel.

2. The energy storage cell of claim 1, wherein the positive electrode comprises nickel.

3. The energy storage cell of claim 1, wherein the first material is a nickel-base alloy.

4. The energy storage cell of claim 1, wherein the vent means further includes
   a heater operable to controllably heat at least part of the vent segment.

5. The energy storage cell of claim 1, wherein the at least one plate set comprises a plurality of plate sets.

6. The energy storage cell of claim 1, wherein the vent segment is in the form of a hollow tube joined to the wall of the pressure vessel and made at least in part of the second material, an interior of the hollow tube being in communication with an interior of the pressure vessel.

7. The energy storage cell of claim 1, wherein the second material comprises palladium.

8. An energy storage cell, comprising:
   a hermetic pressure vessel having a wall, a first portion of the wall being made of a first material that does not permit the diffusion of hydrogen therethrough;
   a hydrogen vent through the wall of the pressure vessel, the hydrogen vent comprising a second portion of the wall and being made of a second material that controllably permits the catalyzed diffusion of hydrogen therethrough;
   at least one plate set within the pressure vessel, each plate set comprising a positive electrode and a negative electrode;

an electrolyte within the pressure vessel; and a pair of electrical leads extending from the at least one plate set and through an electrical feedthrough in the wall of the pressure vessel to an exterior of the pressure vessel.

9. The energy storage cell of claim 8, wherein the hydrogen vent comprises a hollow tube made at least in part of the second material and joined to the wall of the pressure vessel such that an interior of the hollow tube is in communication with an interior of the pressure vessel, and a heater operable to controllably heat at least that portion of the hollow tube made of the second material.

10. The energy storage cell of claim 8, wherein the second material comprises palladium.

11. The energy storage cell of claim 10 wherein the second material is selected from the group consisting of pure palladium and an alloy of palladium.

12. The energy storage cell of claim 8, wherein the positive electrode comprises nickel.

13. The energy storage cell of claim 8, wherein the first material is a nickel-base alloy.

14. The energy storage cell of claim 8, further including means for preventing the condensation of water in the hydrogen vent.

15. An energy storage cell, comprising a hermetic pressure vessel having a wall, a first portion of the wall being made of a nickel-base alloy;

a hollow tube at least in part comprising palladium and joined to the wall of the pressure vessel such that an interior of the hollow tube is in communication with an interior of the pressure vessel;

a heater operable to controllably heat at least a portion of that part of the hollow tube made of palladium;

at least one plate set within the pressure vessel, each plate set comprising a positive electrode made of nickel and a negative electrode;

an electrolyte within the pressure vessel; and a pair of electrical leads extending from the at least one plate set and through an electrical feedthrough in the wall of the pressure vessel to an exterior of the pressure vessel.

16. The energy storage cell of claim 15, wherein the hollow tube is made of a material selected from the group consisting of pure palladium and an alloy of palladium.

17. The energy storage cell of claim 15, further including means for preventing the condensation of water in a portion of that part of the hollow tube made of palladium.

18. The energy storage cell of claim 15, further including a pressure monitor operable to determine the pressure within the pressure vessel, and a pressure controller having as an input the pressure within the pressure vessel as determined by the pressure monitor and as an output a power signal to the heater.

* * * * *